(12) United States Patent
Huang et al.

(10) Patent No.: US 11,210,348 B2
(45) Date of Patent: Dec. 28, 2021

(54) DATA CLUSTERING METHOD AND APPARATUS BASED ON K-NEAREST NEIGHBOR AND COMPUTER READABLE STORAGE MEDIUM

(71) Applicant: HUIZHOU UNIVERSITY, Guangdong (CN)

(72) Inventors: Jinqiu Huang, Guangdong (CN); Deming Xu, Guangdong (CN); Changlin Wan, Guangdong (CN)

(73) Assignee: HUIZHOU UNIVERSITY, Huizhou (CN)

(*) Notice: Subject to any disclaimer, the term of this patent is extended or adjusted under 35 U.S.C. 154(b) by 446 days.

(21) Appl. No.: 16/396,682

(22) Filed: Apr. 27, 2019

(65) Prior Publication Data

US 2019/0251121 A1 Aug. 15, 2019

Related U.S. Application Data

(63) Continuation-in-part of application No. PCT/CN2018/091697, filed on Jun. 15, 2018.

(30) Foreign Application Priority Data

Jan. 13, 2018 (CN) .......................... 201810037867.2

(51) Int. Cl.
G06F 16/906 (2019.01)
G06F 17/18 (2006.01)
G06K 9/62 (2006.01)

(52) U.S. Cl.
CPC ............ *G06F 16/906* (2019.01); *G06F 17/18* (2013.01); *G06K 9/6215* (2013.01); *G06K 9/6221* (2013.01); *G06K 9/6223* (2013.01)

(58) Field of Classification Search
None
See application file for complete search history.

(56) References Cited

U.S. PATENT DOCUMENTS

| | | | | |
|---|---|---|---|---|
| 6,092,072 | A * | 7/2000 | Guha | G06K 9/622 707/700 |
| 8,363,961 | B1 * | 1/2013 | Avidan | G06K 9/6218 382/225 |
| 2009/0132594 | A1 * | 5/2009 | Syeda-Mahmood | G06K 9/6273 |
| 2013/0262465 | A1 * | 10/2013 | Galle | G06F 16/00 707/737 |
| 2016/0342677 | A1 * | 11/2016 | Nuchia | G06F 16/285 |

* cited by examiner

*Primary Examiner* — James Trujillo
*Assistant Examiner* — Kurt A Mueller

(57) ABSTRACT

The present disclosure provides a data clustering method based on K-nearest neighbor, which sorts data points to be clustered in ascending order according to the maximum radiuses of K-nearest neighbors of the data points, that is, according to the density, and perform the first pass across the data points after sorting the data points in ascending order to incorporate the data points that conform to the statistical similarity into the same cluster; then perform the second pass across the data points with smaller cluster density according to the scale required during the clustering to find out all noise points and incorporate non-noise points into the nearest large-density cluster, so as to realize data clustering, which has the benefits of no need to preset the number of clusters and know the probability distribution of the data and convenience to set parameters.

10 Claims, 14 Drawing Sheets

US 11,210,348 B2

DATA CLUSTERING METHOD AND APPARATUS BASED ON K-NEAREST NEIGHBOR AND COMPUTER READABLE STORAGE MEDIUM

CROSS-REFERENCE TO RELATED APPLICATION

The present application is a continuation-in-part application of PCT Application No. PCT/CN2018/091697 filed on Jun. 15, 2018, which claims the benefit of Chinese Patent Application No. 201810037867.2 filed on Jan. 13, 2018. The contents of the above are hereby incorporated by reference.

TECHNICAL FIELD

The present invention relates to the technical field of data process, in particular to a data clustering method and apparatus based on K-nearest neighbor and computer readable storage medium.

BACKGROUND OF THE INVENTION

With the development of data processing technology, more and more data (such as the big data generated by the internet and the Internet of Things) are needed to be quickly and accurately classified. Data clustering is such an automatic classification method and device.

Currently, Most data clustering method is toward improving in both efficient execution and effectiveness. For efficient execution, data clustering can process large-scale data well through effective sampling techniques. On the other hand, the effectiveness of clustering is a more serious problem.

The inventors have found that the following technical problems exist in the prior art when figuring out the technical solutions according the present disclosure:

Firstly, many data clustering methods require proceeding knowledge or probability distribution assumptions, which are usually not known in advance in practical applications. For example, both the K-means clustering method and the EM maximum expectation method need to know in advance the number of clusters of the data.

Secondly, the difficulty of parameter adjustment reduces the availability of data clustering. For example, the density-based DBSCAN method requires two parameters, that is, radius epsilon and minimum number of minpts, to define density thresholds. Since the density of data tends to vary widely and the distances between data have different scales, these parameters are seriously dependent on specific data.

Thirdly, most traditional data clustering can only obtain the cluster to which each data point belongs, but is unable to obtain the hierarchical relationship between clusters. However, existing hierarchical clustering methods, such as SLINK, have two main deficiencies, which are relatively high time and space costs and significant "chain effect" respectively.

SUMMARY OF THE INVENTION

The present application provides a data clustering method and apparatus based on K-nearest neighbor and computer readable storage medium, which effectively solves the three main problems that exist in the prior art, which requires more presupposition knowledge, has difficulty in setting clustering parameters, and is unable to obtain the hierarchical relationship between clusters.

Embodiments of the present disclosure provide a data clustering method based on K-nearest neighbor, wherein the method comprises:

S1, sorting data points to be clustered in ascending order according to maximum radiuses of K-nearest neighbors of the data points; wherein the maximum radius of the K-nearest neighbor of each said data point refers to a maximum distance from the data point in the K-nearest neighbor of the data point;

The data to be classified is stored in the storage medium, and the data processor read a random data sample from the data storage medium by the sampling technology, if the data set in the storage medium is too large to do clustering in a reasonable time.

S2, performing a first pass across the data points after sorting the data points in ascending order, calculating a K-nearest neighbor statistical property value of each data point, comparing the K-nearest neighbor statistical property value of the data point and a K-nearest neighbor statistical property value of a proximity cluster of the data point; when the difference between the K-nearest neighbor statistical property value of the data point and the K-nearest neighbor statistical property value of the proximity cluster of the data point is less than a first threshold, incorporating the data point in the proximity cluster; if the data point can be incorporated in multiple proximity clusters, merging proximity clusters from near to far distances between the proximity clusters and the data point to obtain a merged cluster until a number of data points in the merged cluster exceeds a second threshold; when the difference between the K-nearest neighbor statistical property value of the data point and the K-nearest neighbor statistical property value of the proximity cluster of the data point exceeds the first threshold, generating a new cluster that containing the data point; and S3, when the first pass is finished, performing a second pass across data points in a cluster of which the number of the data points is less than the second threshold; if the K-nearest neighbor statistical property value of a data point is greater than or equal to n times of the K-nearest neighbor statistical property value of any other data point in the K-nearest neighbor of the data point, marking the data point as noise data point, otherwise incorporating the data point into a cluster to which a data point belongs which is nearest the data point; n>1.

Compared with the prior art, the embodiments of the present disclosure provide the data clustering method based on K-nearest neighbor provided by the embodiment of the present disclosure sorts data points to be clustered in ascending order according to the maximum radiuses of K-nearest neighbors of the data points, that is, according to the density, and perform the first pass across the data points after sorting the data points in ascending order to incorporate the data points that conform to the statistical similarity into the same cluster; then perform the second pass across the data points with smaller cluster density according to the scale required during the clustering to find out all noise points and incorporate non-noise points into the nearest large-density cluster, so as to realize data clustering. It can be seen that the data clustering method based on K-nearest neighbor provided by the embodiment of the present disclosure has the following technical effects. Firstly, it is not necessary to preset the number of clusters, and it is not necessary to know the probability distribution of the data; secondly, the parameters are easy to set, and the setting of each parameter is independent of the density distribution and distance scale of the data; thirdly, clusters are formed by gradually merging from high density to low density, and the hierarchical relationship between clusters is obtained when the clusters are generated.

Furthermore, the K-nearest neighbor of each data point refers to a set of K data points which are nearest the data point; the K value is preset as 5 to 9.

Furthermore, the K-nearest neighbor statistical property value of each said data point comprises at least one of a maximum radius of the K-nearest neighbor, a mean radius of the K-nearest neighbor and a standard deviation of radiuses of the K-nearest neighbor of the data point; correspondingly, the K-nearest neighbor statistical property value of the proximity cluster of the data point comprises at least one of a mean value of the maximum radiuses of the K-nearest neighbors of all data points of the proximity cluster, a mean value of the mean radiuses of the K-nearest neighbors of all data points of the proximity cluster, and a mean value of the standard deviations of the radiuses of the K-nearest neighbors of all data point of the proximity cluster.

Furthermore, in the step S2, the K-nearest neighbor statistical property value of each said data point comprises the mean radius of the K-nearest neighbor and the standard deviation of radiuses of the K-nearest neighbor of the data point; if the K-nearest neighbor statistical property value of the data point and the K-nearest neighbor statistical property value of the proximity cluster of the data point satisfy the following formula 1) and formula 2), the difference between the K-nearest neighbor statistical property value of the data point and the K-nearest neighbor statistical property value of the proximity cluster of the data point is determined to be less than the first threshold:

$$\text{mean}(S(M))\_m \times \text{std}(S(M)) \geq p(M) \leq \text{mean}(S(M)) + m \times \text{std}(S(M)); \quad \text{formula 1),}$$

$$\text{mean}(S(V))\_m \times \text{std}(S(V)) \geq p(V) \leq \text{mean}(S(V)) + m \times \text{std}(S(V)); \quad \text{formula 2),}$$

Wherein, p(M) is the radius mean of the K-nearest neighbor of the data point p, p(V) is the standard deviation of the radiuses of the K-nearest neighbor of the data point p, and mean(S(M)) is the mean value of the mean radiuses of the K-nearest neighbors of all data points of the proximity cluster S, mean(S(V)) is the mean value of the standard deviations of the radiuses of the K-nearest neighbors of all data point of the proximity cluster S, and std(S(M)) is a square deviation of the mean radiuses of the K-nearest neighbors of all data points of, std(S(V)) is a square deviation of the standard deviation of the radiuses of the K-nearest neighbors of all data points of the proximity cluster S, and m is the first threshold, which is a preset coefficient.

Furthermore, the first threshold m is set as 1 to 10.

Furthermore, in the step S3, if the K-nearest neighbor statistical property value of the data point satisfies the following formula 3), it is determined that the K-nearest neighbor statistical property value of a data point is greater than or equal to n times of the K-nearest neighbor statistical property value of any other data point in the K-nearest neighbor of the data point;

$$p(M) \geq q(M) \times n, q \in N\ k(p); \quad \text{formula 3),}$$

Wherein, p(M) is the radius mean of the K-nearest neighbor of the data point p, q(M) is the radius mean of the K-nearest neighbor of the data point q, N k (p) is the K-nearest neighbor of the data point p, and the n is preset as 3~5.

Furthermore, in the step S3, a cluster in which the total number of data points among all clusters is greater than or equal to the second threshold is defined as a significant cluster, and a cluster in which the total number of data points among all clusters is less than the second threshold is defined as a non-significant cluster;

if the K-nearest neighbor statistical property value of a data point is less than or equal to n times of the K-nearest neighbor statistical property value of any other data point in the K-nearest neighbor of the data point, the data point is incorporated into a significant cluster to which a data point belongs which is nearest the data point.

Furthermore, the second threshold can be adjusted according to a required cluster size.

Embodiments of the present disclosure provide A data clustering apparatus based on K-nearest neighbor, the apparatus comprising a processor, wherein the processor is configured to execute the following program modules:

a data point sorting module, is configured to sort data points to be clustered in ascending order according to the maximum radiuses of K-nearest neighbors of the data points; wherein the maximum radius of the K-nearest neighbor of each said data point refers to a maximum distance from the data point in the K-nearest neighbor of the data point;

a first pass performing module, is configured to perform a first pass across the data points after sorting the data points in ascending order, calculating a K-nearest neighbor statistical property value of each data point, comparing the K-nearest neighbor statistical property value of the data point and a K-nearest neighbor statistical property value of a proximity cluster of the data point; when the difference between the K-nearest neighbor statistical property value of the data point and the K-nearest neighbor statistical property value of the proximity cluster of the data point is less than a first threshold, incorporating the data point in the proximity cluster; if the data point can be incorporated in multiple proximity clusters, merging proximity clusters from near to far distances between the proximity clusters and the data point to obtain a merged cluster until a number of data points in the merged cluster exceeds a second threshold; when the difference between the K-nearest neighbor statistical property value of the data point and the K-nearest neighbor statistical property value of the proximity cluster of the data point exceeds the first threshold, generating a new cluster that containing the data point; and a second pass performing module, is configured to when the first pass is finished, performing a second pass across data points in a cluster of which the number of the data points is less than the second threshold; if the K-nearest neighbor statistical property value of a data point is greater than or equal to n times of the K-nearest neighbor statistical property value of any other data point in the K-nearest neighbor of the data point, marking the data point as noise data point, otherwise incorporating the data point into a cluster to which a data point belongs which is nearest the data point; n>1.

Compared with the prior art, the embodiments of the present disclosure provide the data clustering apparatus based on K-nearest neighbor sorts data points to be clustered in ascending order according to the maximum radiuses of K-nearest neighbors of the data points, that is, according to the density, and perform the first pass across the data points after sorting the data points in ascending order to incorporate the data points that conform to the statistical similarity into the same cluster; then perform the second pass across the data points with smaller cluster density according to the scale required during the clustering to find out all noise points and incorporate non-noise points into the nearest large-density cluster, so as to realize data clustering. It can be seen that the data clustering method based on K-nearest neighbor provided by the embodiment of the present disclosure has the following technical effects. Firstly, it is not necessary to preset the number of clusters, and it is not necessary to know the probability distribution of the data; secondly, the parameters are easy to set. and the setting of each parameter is independent of the density distribution and distance scale of the data; thirdly, clusters are formed by gradually merging from high density to low density, and the hierarchical relationship between clusters is obtained when the clusters are generated.

Furthermore, the K-nearest neighbor of each data point refers to a set of K data points which are nearest the data point, the K value is preset as 5 to 9.

Furthermore, the K-nearest neighbor statistical property value of each said data point comprises at least one of a maximum radius of the K-nearest neighbor, a mean radius of the K-nearest neighbor and a standard deviation of radiuses of the K-nearest neighbor of the data point; correspondingly, the K-nearest neighbor statistical property value of the proximity cluster of the data point comprises at least one of a mean value of the maximum radiuses of the K-nearest neighbors of all data points of the proximity cluster, a mean value of the mean radiuses of the K-nearest neighbors of all data points of the proximity cluster, and a mean value of the standard deviations of the radiuses of the K-nearest neighbors of all data point of the proximity cluster.

Furthermore, in the step S2, the K-nearest neighbor statistical property value of each said data point comprises the mean radius of the K-nearest neighbor and the standard deviation of radiuses of the K-nearest neighbor of the data point; if the K-nearest neighbor statistical property value of the data point and the K-nearest neighbor statistical property value of the proximity cluster of the data point satisfy the following formula 1) and formula 2), the difference between the K-nearest neighbor statistical property value of the data point and the K-nearest neighbor statistical property value of the proximity cluster of the data point is determined to be less than the first threshold;

$$\text{mean}(S(M))\_m\times\text{std}(S(M))\geq p(M)\leq \text{mean}(S(M))+m\times\text{std}(S(M));\qquad \text{formula 1)},$$

$$\text{mean}(S(V))\_m\times\text{std}(S(V))\geq p(V)\leq \text{mean}(S(V))+m\times\text{std}(S(V));\qquad \text{formula 2)},$$

Wherein, p(M) is the radius mean of the K-nearest neighbor of the data point p, p(V) is the standard deviation of the radiuses of the K-nearest neighbor of the data point p, and mean(S(M)) is the mean value of the mean radiuses of the K-nearest neighbors of all data points of the proximity cluster S, mean(S(V)) is the mean value of the standard deviations of the radiuses of the K-nearest neighbors of all data point of the proximity cluster S, and std(S(M)) is a square deviation of the mean radiuses of the K-nearest neighbors of all data points of, std(S(V)) is a square deviation of the standard deviation of the radiuses of the K-nearest neighbors of all data points of the proximity cluster S, and m is the first threshold, which is a preset coefficient.

Furthermore, the first threshold is set as 1 to 10.

Furthermore, in the step S3, if the K-nearest neighbor statistical property value of the data point satisfies the following formula 3), it is determined that the K-nearest neighbor statistical property value of a data point is greater than or equal to n times of the K-nearest neighbor statistical property value of any other data point in the K-nearest neighbor of the data point;

$$p(M)\geq q(M)\times n, q\in N\ k(p);\qquad \text{formula 3)},$$

Wherein, p(M) is the radius mean of the K-nearest neighbor of the data point p, q(M) is the radius mean of the K-nearest neighbor of the data point q, N k (p) is the K-nearest neighbor of the data point p, and the n is preset as 3~5.

Furthermore, in the step S3, a cluster in which the total number of data points among all clusters is greater than or equal to the second threshold is defined as a significant cluster, and a cluster in which the total number of data points among all clusters is less than the second threshold is defined as a non-significant cluster;

if the K-nearest neighbor statistical property value of a data point is less than or equal to n times of the K-nearest neighbor statistical property value of any other data point in the K-nearest neighbor of the data point, the data point is incorporated into a significant cluster to which a data point belongs which is nearest the data point.

Embodiments of the present disclosure further provide a data clustering apparatus based on K-nearest neighbor, wherein the apparatus comprises a processor, a memory, and a computer program stored in the memory and configured to be executed by the processor, the processor executing the computer program to implement the data clustering method based on K-nearest neighbor mentioned above.

Embodiments of the present disclosure further provide a computer readable storage medium, wherein the computer comprises a stored computer program, wherein when the computer program is running, a device in which the computer readable storage medium is located is controlled to perform the data clustering method based on K-nearest neighbor mentioned above.

DETAILED DESCRIPTION OF THE INVENTION

Hereinafter, with reference to the accompanying drawings, the technical solutions in the embodiments of the present invention are described clearly and completely. It is obvious that the described embodiments are only a part of embodiments of the present invention, not all embodiments. All embodiments obtained based on the embodiments of the present invention by one skilled in the art without creative efforts are within the protection scope of the present invention.

Figure 2A:
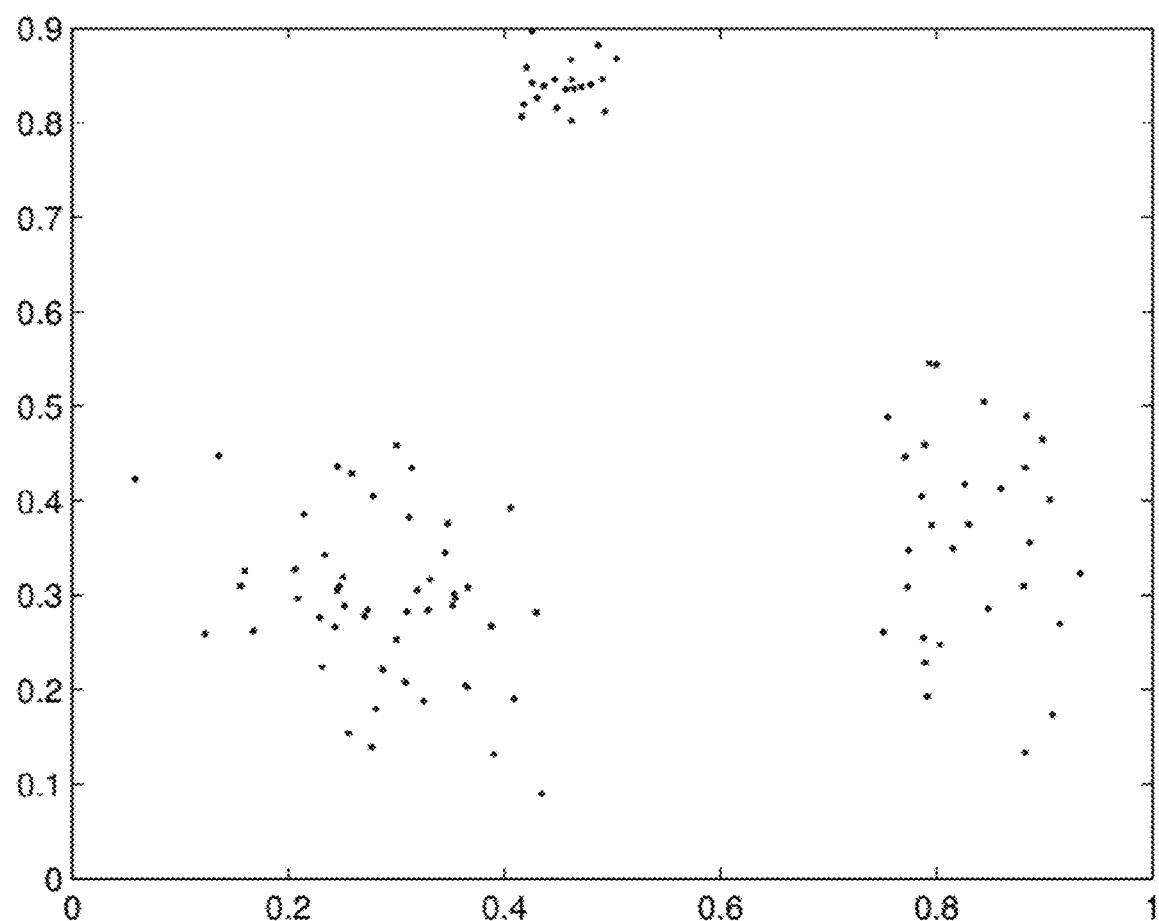
FIG. 2(a) is a flowchart showing the effect of data clustering by using a data clustering method based on the K-nearest neighbor provided by the embodiment of the present invention.
Figure 2B:
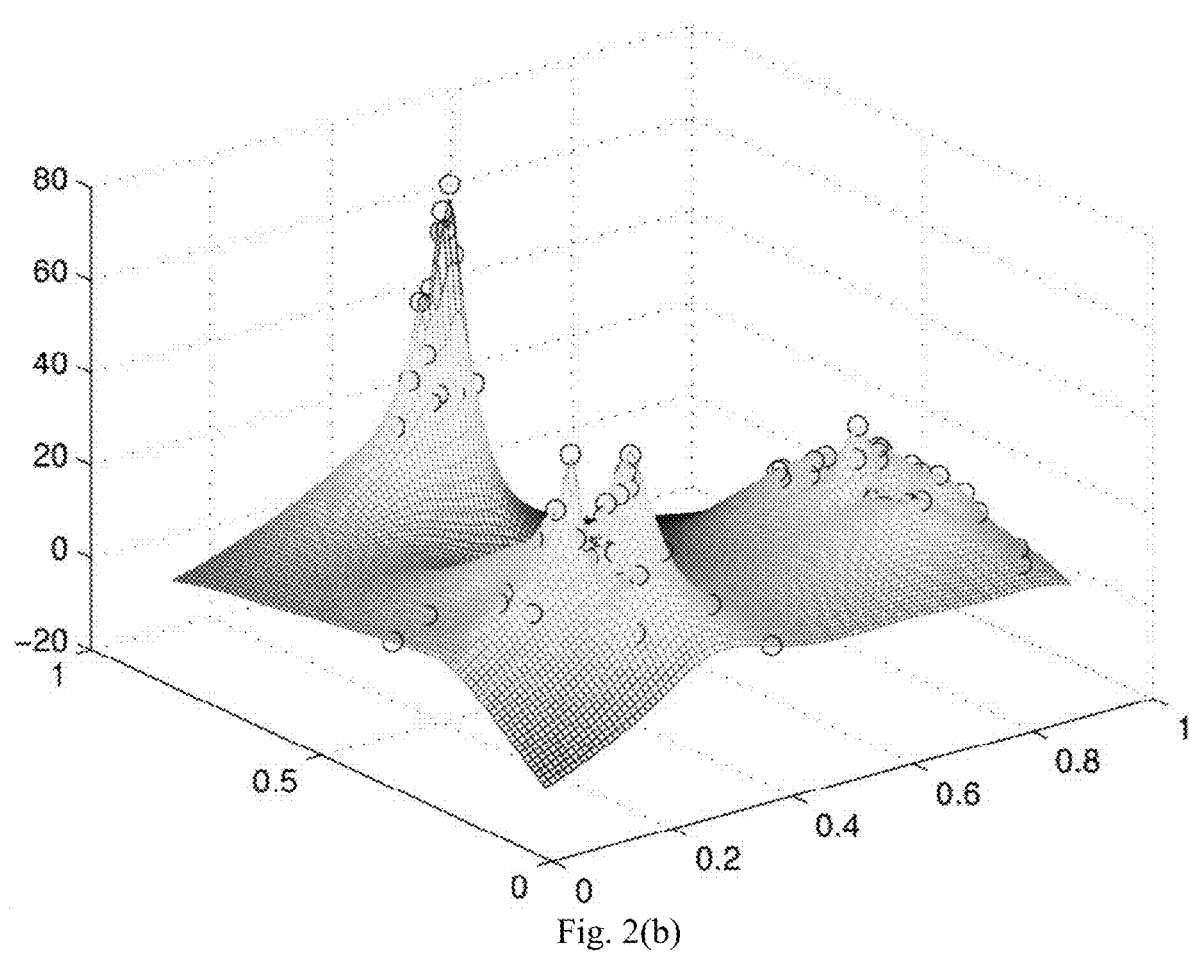
FIG. 2(b) is a flowchart showing the effect of data clustering by using a data clustering method based on the K-nearest neighbor provided by the embodiment of the present invention.
Figure 2C:
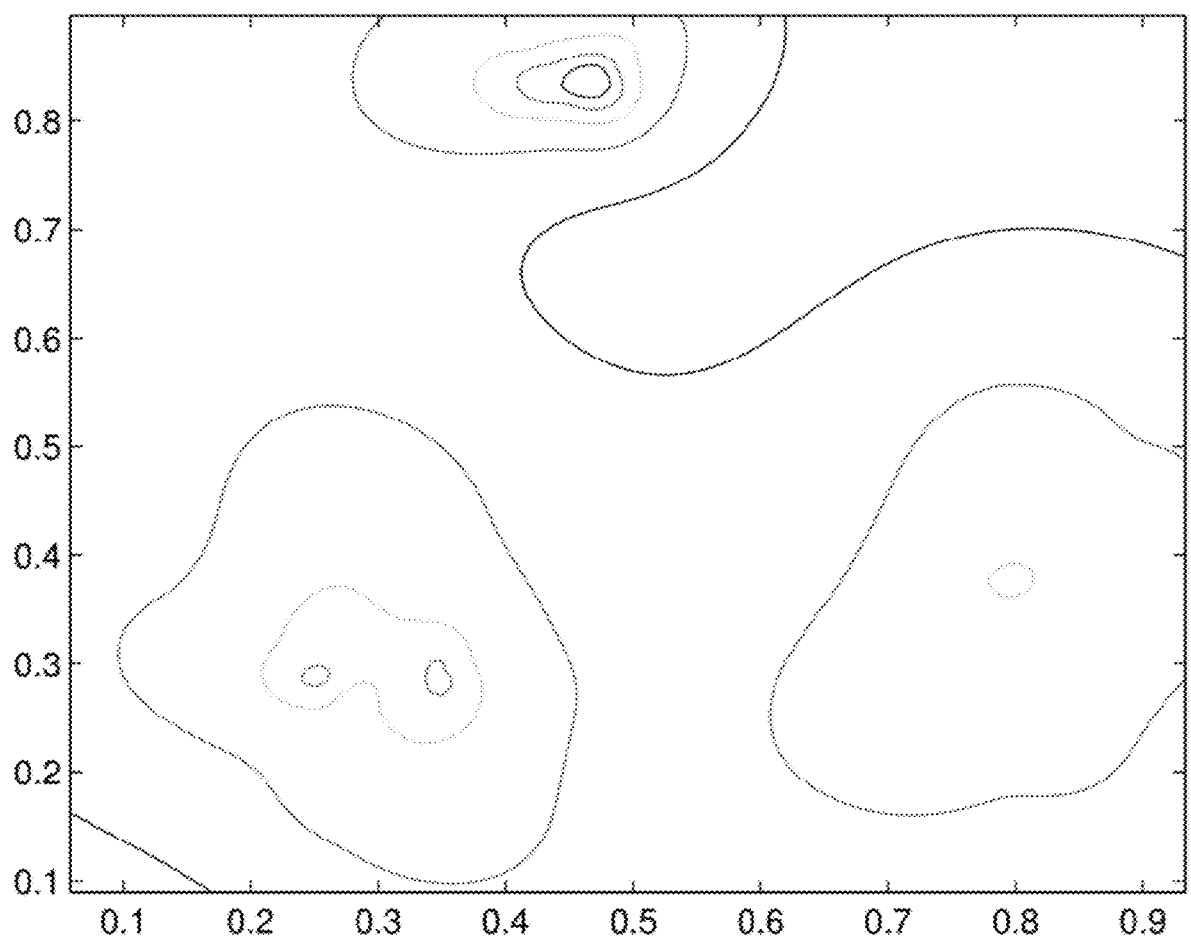
FIG. 2(c) is a flowchart showing the effect of data clustering by using a data clustering method based on the K-nearest neighbor provided by the embodiment of the present invention.
Figure 2D:
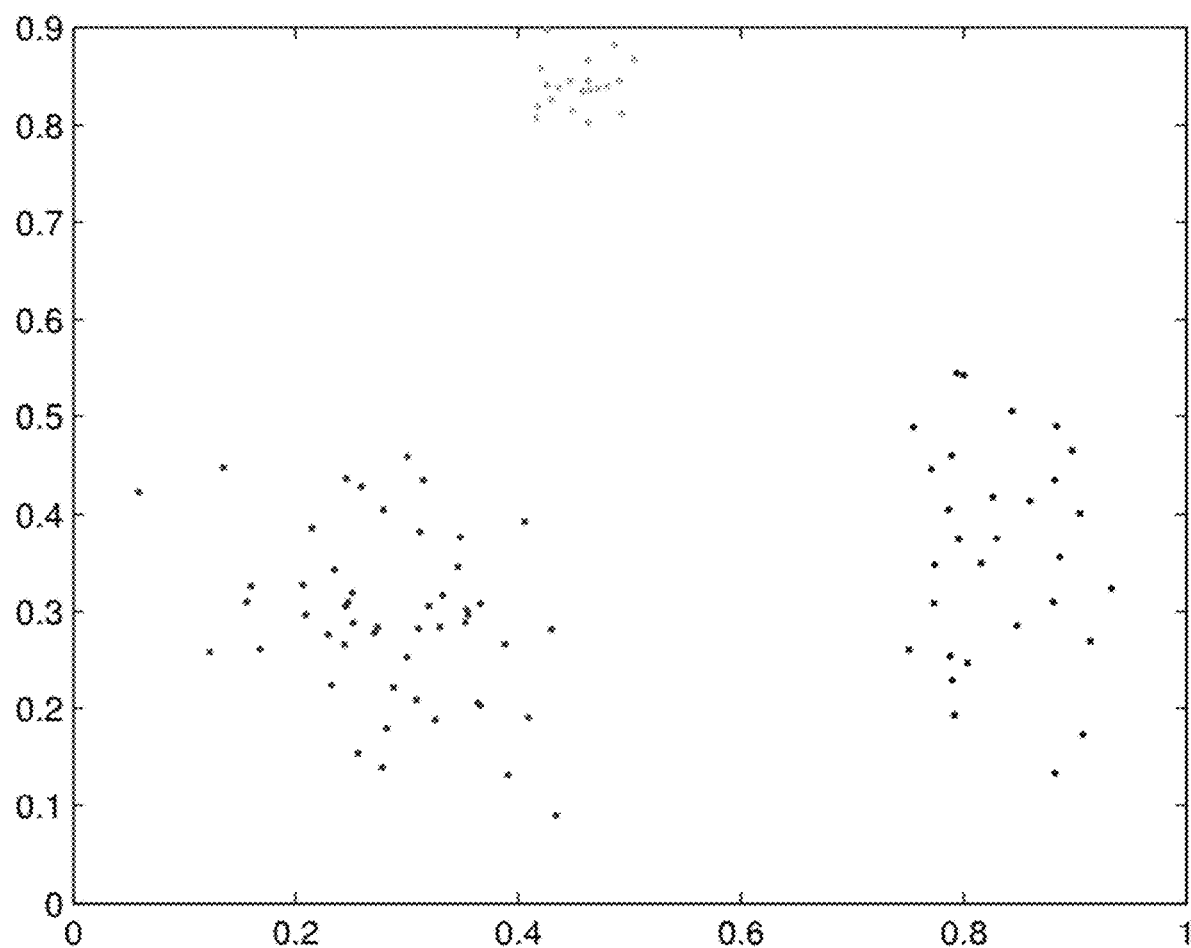
FIG. 2(d) is a flowchart showing the effect of data clustering by using a data clustering method based on the K-nearest neighbor provided by the embodiment of the present invention.

The embodiments of the present disclosure provide a data clustering method based on K-nearest neighbor and a corresponding apparatus, wherein the clustering definition of the embodiments of the present invention is based on statistical data points. A data cluster (cluster) is often defined as a set of similar data. In an embodiment of the invention, the concept of similarity may be related to the statistical properties of the cluster and the density of the data. Referring to FIGS. 2(a) to 2(d), as shown in FIG. 2(a), the data points are distributed in three regions of the data space. As shown in FIG. 2(b), the database can be drawn as a data density surface with approximately three peaks at the center of the three clusters with additional density axes. The database and data density face can be divided into coherent parts, i.e., data blocks, represented by the density profile shown in FIG. 2(c). If you collect data points along the downward direction of density, data clusters will gradually appear. As shown in FIG. 2(c), when the size of the connected cluster is smaller than the expected value, it is reasonable to merge the connected clusters, and the significant clusters do not merge with each other. As shown in FIG. 2(d), the final clustering result is generated.

The present disclosure will explain the data clustering method and apparatus through various embodiments. Before explaining, various terms appearing in the embodiments of the present invention are firstly defined:

Definition 1 (K-nearest neighbor): The K-nearest neighbor of a data point refers to a set of K data points that are nearest to the data point.

For example, the set Nk(p) represents the K-nearest neighbor of the data point p, and the set Nk(p) comprises K data points, then any data point q in the set satisfies: dist(p,q)≤dist(p,o), Wherein dist(p,q) represents the distance between data point p and data point q, and data point o doesn't belong to the set Nk(p).

Definition 2 (maximum radius of the K-nearest neighbor): The maximum radius of the K neighborhood of a data point is the maximum distance from the data point in the K-nearest neighbor of the data point.

For example, Rk(p) is used to represent the maximum radius of the K-nearest neighbor of the data point p, then Rk(p) satisfies: Rk(p)=max(dist(p,q)), q∈Nk(p).

Definition 3 (mean radius of the K-nearest neighbor): The mean radius of the K-nearest neighbor of a data point refers to the mean of the distance between every two data points in the K-nearest neighbor of the data point.

For example, Mk(p) is used to represent the mean radius of the K-nearest neighbor of data point p, then Mk(p)=mean(dist(a,b)), where a, b∈Nk(p). Mean(dist(a,b)) represents the mean of the distances between any two data points a and data points b in Nk(p).

Definition 4 (standard deviation of radiuses of the K-nearest neighbor): The standard deviation of radiuses of the K-nearest neighbor of a data point refers to the standard deviation of the distances between two data points in the K-nearest neighbor of the data point.

For example, if Vk(p) is used to represent the standard deviation of radiuses of the K-nearest neighbor of data point p, then Vk(p)=std(dist(a,b)), where a, b∈Nk(p). Std(dist(a, b)) represents the square variance of the distances between any two data points a and data points b in Nk(p).

Definition 5 (statistical data point): The statistical data point of a data point refers to K-nearest neighbor statistical property value which is attached to the data point, including (but not limited to) a maximum radius of the K-nearest neighbor, a mean radius of the K-nearest neighbor, and a standard deviation of radiuses of the K-nearest neighbor.

For example, p(R, M, V) can be used to represent the K-domain statistical property value of data point p. Wherein, p(R) represents the maximum radius of the K-nearest neighbor of the data point p, p(M) represents the mean radius of the K-nearest neighbor of the data point p, and p(V) represents the standard deviation of radiuses of the K-nearest neighbor of the data point p.

Definition 6 (statistical similarity): if the difference between the mean of values of each statistical feature of a data point set for and the value of the corresponding statistical feature of one data point is less than delta units (usually taking the standard deviation of the values of the statistical feature of the data point set as the unit), the data point set is determined to have statistical similarity.

For example, S(R, M, V) represents the statistical feature value of the data point set. If p(R, M, V) of the data point p satisfies the following two conditions are satisfied, the data point set S is determined to have statistical similarity:

$$\text{mean}(S(M))\_\text{delta}\times\text{std}(S(M))\geq p(M)\leq \text{mean}(S(M))+\text{delta}\times\text{std}(S(M));\quad\quad\text{Condition 1)}$$

$$\text{mean}(S(V))\_\text{delta}\times\text{std}(S(V))\geq p(V)\leq \text{mean}(S(V))+\text{delta}\times\text{std}(S(V));\quad\quad\text{Condition 2)}$$

Among them, delta is a threshold constant.

Definition 7 (cluster combination): Two data point sets C1 and C2 are statistical similarity sets, if there is a data point p that satisfies the following conditions:

1) The data point p and the data point set C1 have statistical similarity;

2) The data point p and the data point set C2 have statistical similarity;

3) The mean radius M of the K-nearest neighbor of the data point p is less than or equal to nsr times of the minimum M of C1, nsr is an adjustable parameter, or the number of data points in C1 is less than the significance parameter nspts;

4) The mean radius M of the K-nearest neighbor of the data point p is less than or equal to nsr times of the minimum M of C2, nsr is an adjustable reference book, or the number of data points in C2 is less than the significance parameter nspts.

Then the two data point sets C1 and C2 can be combined as a joint statistical similarity set.

Definition 8 (Significant Cluster): A data cluster is a significant cluster if and only if number of data points in the data cluster is more than or equal to a significant parameter nspts.

Definition 9 (noise point): When the mean radius M of the K-nearest neighbor of a data point is greater than or equal to the nsr times of the mean radius M of the K-nearest neighbor of any data point belonging to a significant cluster in the K-nearest neighbor, the data point is determined as a noise point.

For example, when there is a data point p satisfying $p(M) \geq q(M) \times nsr$, $q \in N\ k\ (p)$, and the data point q is included in any significant cluster, the data point p is a noise point.

Figure 1:
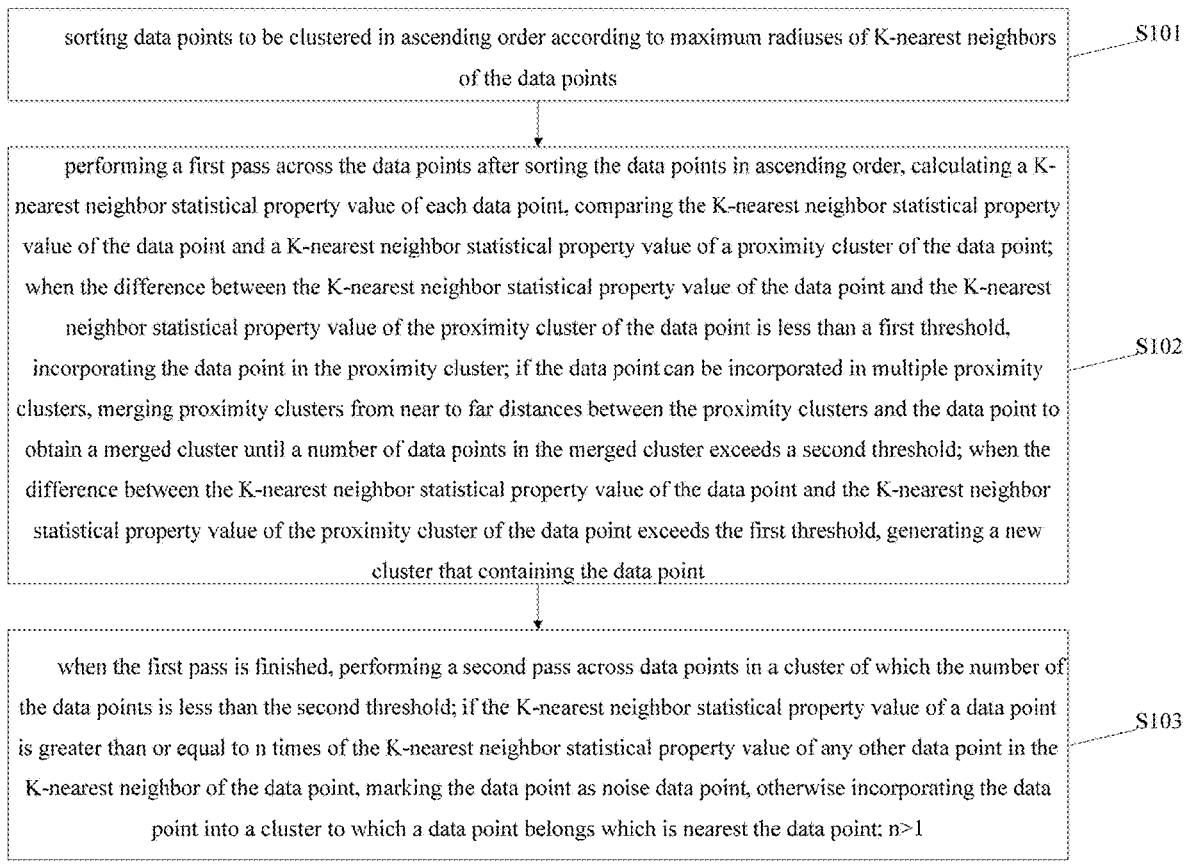
FIG. 1 is a schematic flowchart of a data clustering apparatus based on the K-nearest neighbor according to an embodiment of the present invention.

With reference to FIG. 1, a data clustering method based on K-nearest neighbor, according to one embodiment of the present disclosure comprises steps of S101~S103;

S101, sorting data points to be clustered in ascending order according to maximum radiuses of K-nearest neighbors of the data points;

Wherein, the maximum radius of the K-nearest neighbor of each said data point refers to a maximum distance from the data point in the K-nearest neighbor of the data point; the K-nearest neighbor of each data point refers to a set of K data points which are nearest the data point. In the present embodiment, K value is usually 5~9.

S102, performing a first pass across the data points after sorting the data points in ascending order, calculating a K-nearest neighbor statistical property value of each data point, comparing the K-nearest neighbor statistical property value of the data point and a K-nearest neighbor statistical property value of a proximity cluster of the data point; when the difference between the K-nearest neighbor statistical property value of the data point and the K-nearest neighbor statistical property value of the proximity cluster of the data point is less than a first threshold, incorporating the data point in the proximity cluster; if the data point can be incorporated in multiple proximity clusters, merging proximity clusters from near to far distances between the proximity clusters and the data point to obtain a merged cluster until a number of data points in the merged cluster exceeds a second threshold; when the difference between the K-nearest neighbor statistical property value of the data point and the K-nearest neighbor statistical property value of the proximity cluster of the data point exceeds the first threshold, generating a new cluster that containing the data point; and S103, when the first pass is finished, performing a second pass across data points in a cluster of which the number of the data points is less than the second threshold; if the K-nearest neighbor statistical property value of a data point is greater than or equal to n times of the K-nearest neighbor statistical property value of any other data point in the K-nearest neighbor of the data point, marking the data point as noise data point, otherwise incorporating the data point into a cluster to which a data point belongs which is nearest the data point.

It should be noted that the first threshold is labeled as m, the second threshold is labeled as t.

In one embodiment, n>1, t>2. The K-nearest neighbor statistical property value of each data point comprises at least one of a maximum radius of the K-nearest neighbor, a mean radius of the K-nearest neighbor, and a standard deviation of radiuses of the K-nearest neighbor of the data point; correspondingly, the K-nearest neighbor statistical property value of the proximity cluster of the data point comprises at least one of a mean value of the maximum radiuses of the K-nearest neighbors of all data points of the proximity cluster, a mean value of the mean radiuses of the K-nearest neighbors of all data points of the proximity cluster, and a mean value of the standard deviations of the radiuses of the K-nearest neighbors of all data point of the proximity cluster.

Optionally, in the step S102, The K-nearest neighbor statistical property value of each data point comprises the mean radius of the K-nearest neighbor and the standard deviation of radiuses of the K-nearest neighbor of the data point. If the K-nearest neighbor statistical property value of the data point and the K-nearest neighbor statistical property value of the proximity cluster of the data point satisfy the following formula 1) and formula 2), the difference between the K-nearest neighbor statistical property value of the data point and the K-nearest neighbor statistical property value of the proximity cluster of the data point is determined to be less than the first threshold:

$$\text{mean}(S(M))\_m \times \text{std}(S(M)) \geq p(M) \leq \text{mean}(S(M)) + m \times \text{std}(S(M)); \quad \text{formula 1)},$$

$$\text{mean}(S(V))\_m \times \text{std}(S(V)) \geq p(V) \leq \text{mean}(S(V)) + m \times \text{std}(S(V)); \quad \text{formula 2)},$$

Wherein, p(M) is the radius mean of the K-nearest neighbor of the data point p, p(V) is the standard deviation of the radiuses of the K-nearest neighbor of the data point p, and mean(S(M)) is the mean value of the mean radiuses of the K-nearest neighbors of all data points of the proximity cluster S, mean(S(V)) is the mean value of the standard deviations of the radiuses of the K-nearest neighbors of all data point of the proximity cluster S, and std(S(M)) is a square deviation of the mean radiuses of the K-nearest neighbors of all data points of, std(S(V)) is a square deviation of the standard deviation of the radiuses of the K-nearest neighbors of all data points of the proximity cluster S, and m is the first threshold, which is a preset coefficient. In this embodiment, m is usually 1~10.

Optionally, in the step S103, if the K-nearest neighbor statistical property value of the data point satisfies the following formula 3), it is determined that the K-nearest neighbor statistical property value of a data point is greater than or equal to n times of the K-nearest neighbor statistical property value of any other data point in the K-nearest neighbor of the data point;

$$p(M) \geq q(M) \times n, q \in N\ k(p); \quad \text{formula 3)},$$

Wherein, p(M) is the radius mean of the K-nearest neighbor of the data point p, q(M) is the radius mean of the K-nearest neighbor of the data point q, N k (p) is the K-nearest neighbor of the data point p, and the n is usually preset as 3~5.

Further, according to the present embodiment, a cluster in which the total number of data points among all clusters is greater than or equal to the second threshold t is defined as a significant cluster, and a cluster in which the total number of data points among all clusters is less than the second threshold t is defined as a non-significant cluster. Wherein, the second threshold t can be adjusted according to a required cluster size. In the step S103, if the K-nearest neighbor statistical property value of a data point is less than or equal to n times of the K-nearest neighbor statistical property value of any other data point in the K-nearest neighbor of the data point, the data point is incorporated into a significant cluster to which a data point belongs which is nearest the data point.

It can be seen that the data clustering method based on K-nearest neighbor provided by the embodiment of the present disclosure sorts data points to be clustered in ascending order according to the maximum radiuses of K-nearest neighbors of the data points, that is, according to the density, and perform the first pass across the data points after sorting the data points in ascending order to incorporate the data points that conform to the statistical similarity into the same cluster; then perform the second pass across the data points with smaller cluster density according to the scale required during the clustering to find out all noise points and incorporate non-noise points into the nearest large-density cluster, so as to realize data clustering. It can be seen that the data clustering method based on K-nearest neighbor provided by the embodiment of the present disclosure has the following technical effects. Firstly, it is not necessary to preset the number of clusters, and it is not necessary to know the probability distribution of the data; secondly, the parameters are easy to set. The value of K is generally 5-9, the value of m is generally 1-10, the value of n is generally 3-5, and the value of significant parameter t can be self-adjusted according to the required cluster size, and the setting of each parameter is independent of the density distribution and distance scale of the data; thirdly, clusters are formed by gradually merging from high density to low density, and the hierarchical relationship between clusters is obtained when the clusters are generated.

Figure 3A:
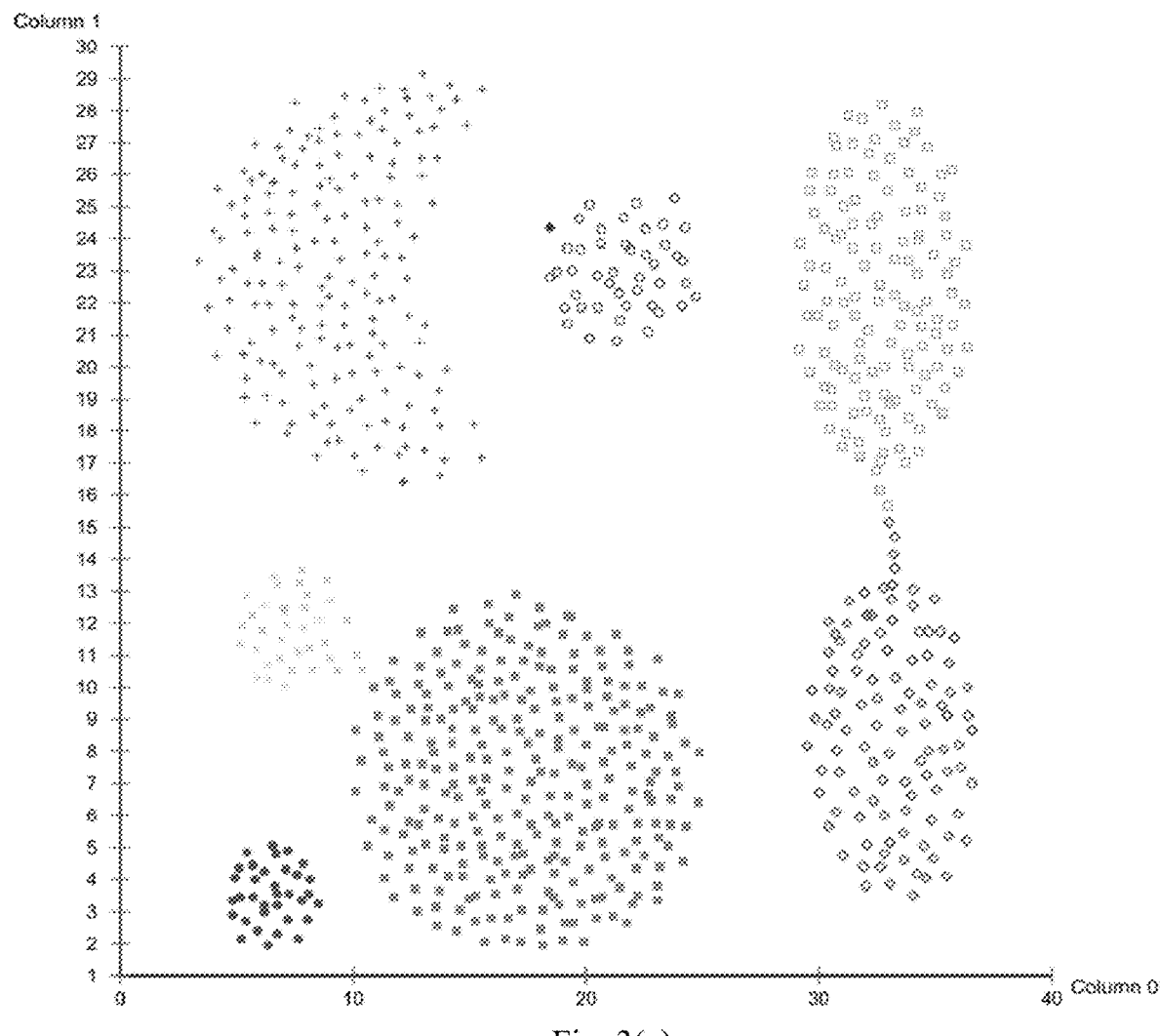
FIG. 3(a) shows the results of data clustering for a data set with a specific shape by using a data clustering method based on the K-nearest neighbor provided by the embodiment of the present invention.
Figure 3B:
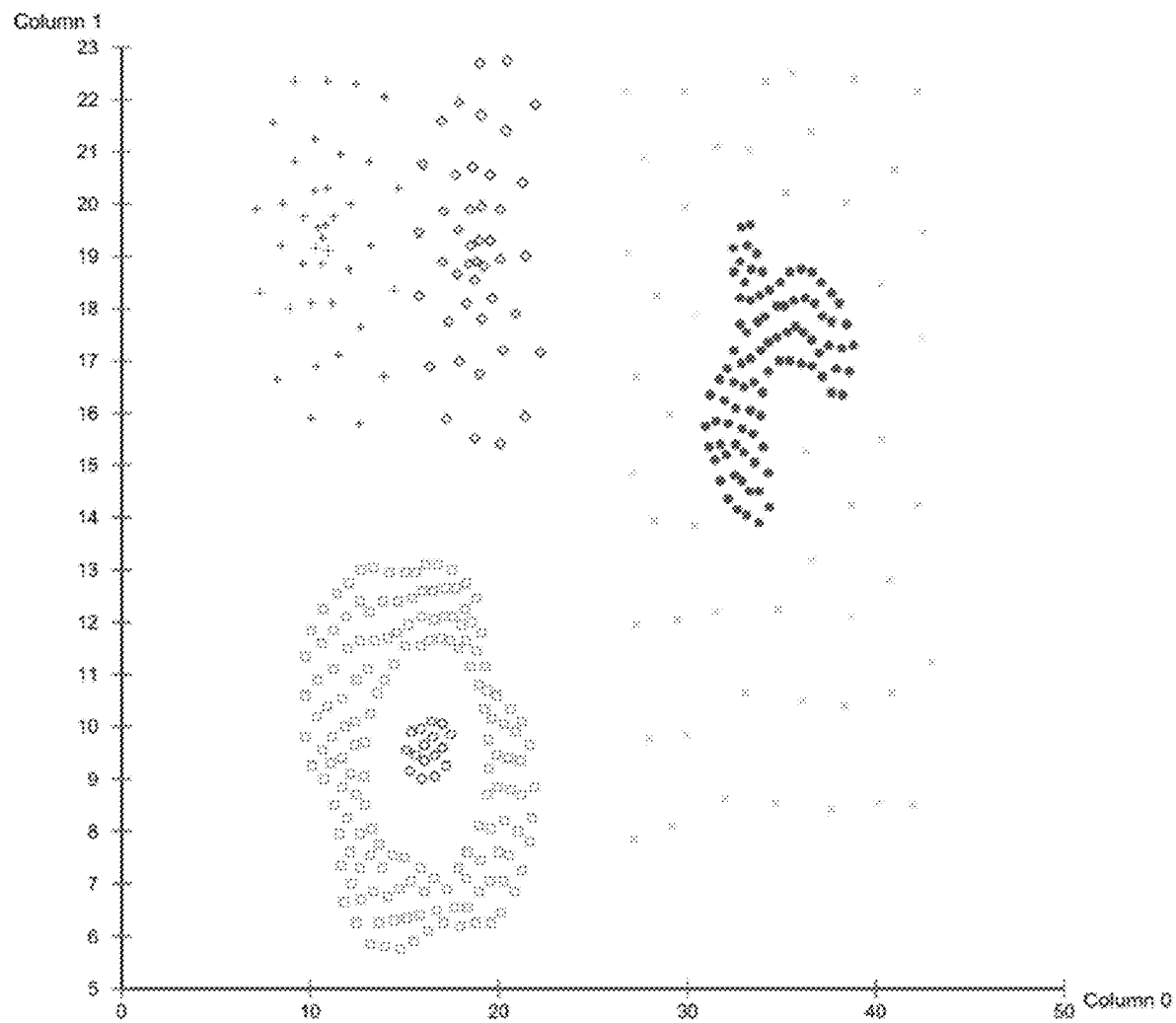
FIG. 3(b) shows the results of data clustering for a data set with a specific shape by using a data clustering method based on the K-nearest neighbor provided by the embodiment of the present invention.
Figure 3C:
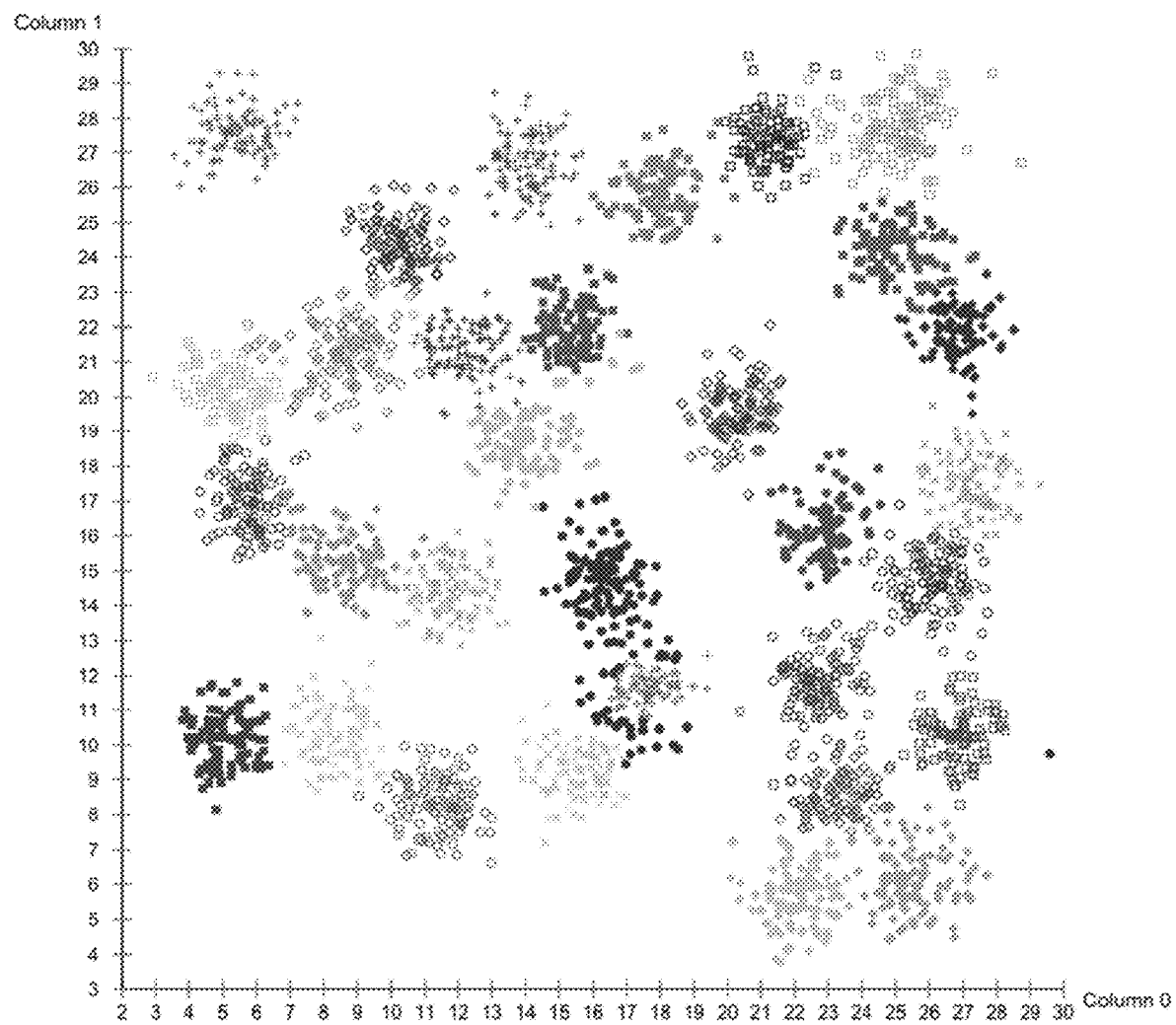
FIG. 3(c) shows the results of data clustering for a data set with a specific shape by using a data clustering method based on the K-nearest neighbor provided by the embodiment of the present invention.
Figure 3D:
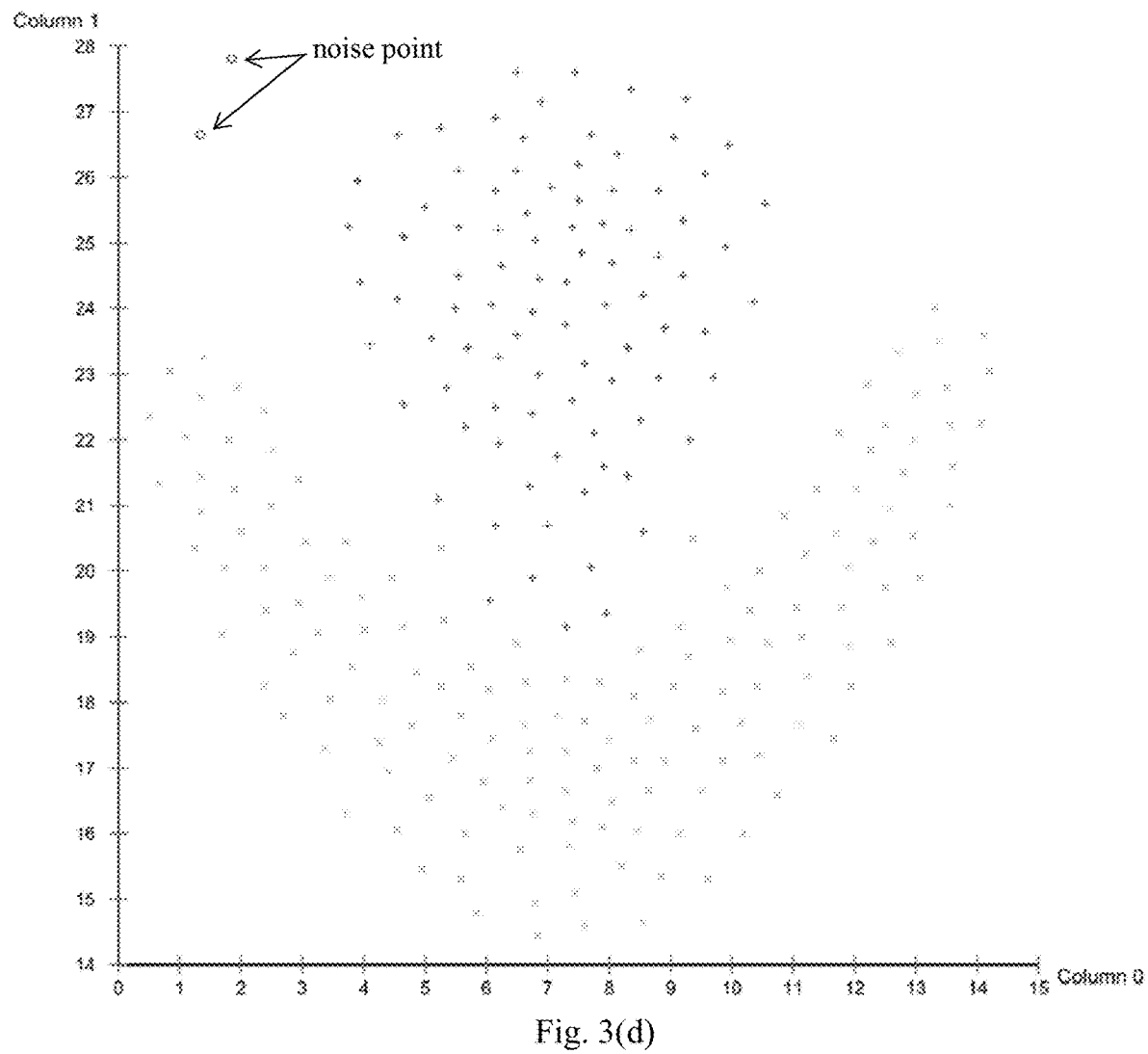
FIG. 3(d) shows the results of data clustering for a data set with a specific shape by using a data clustering method based on e K-nearest neighbor provided by the embodiment of the present invention.
Figure 3E:
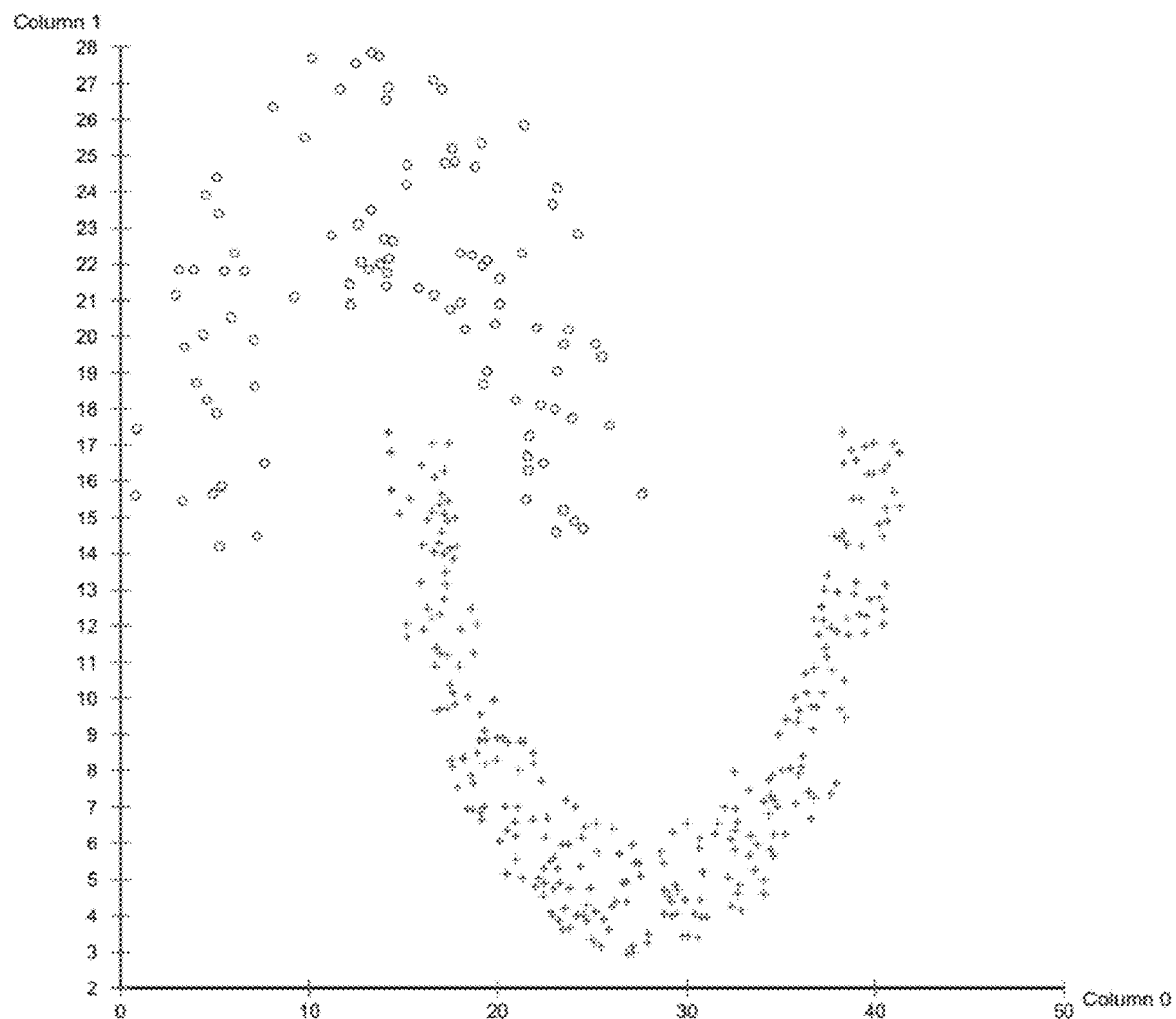
FIG. 3(e) shows the results of data clustering for a data set with a specific shape by using a data clustering method based on the K-nearest neighbor provided by the embodiment of the present invention.
Figure 3F:
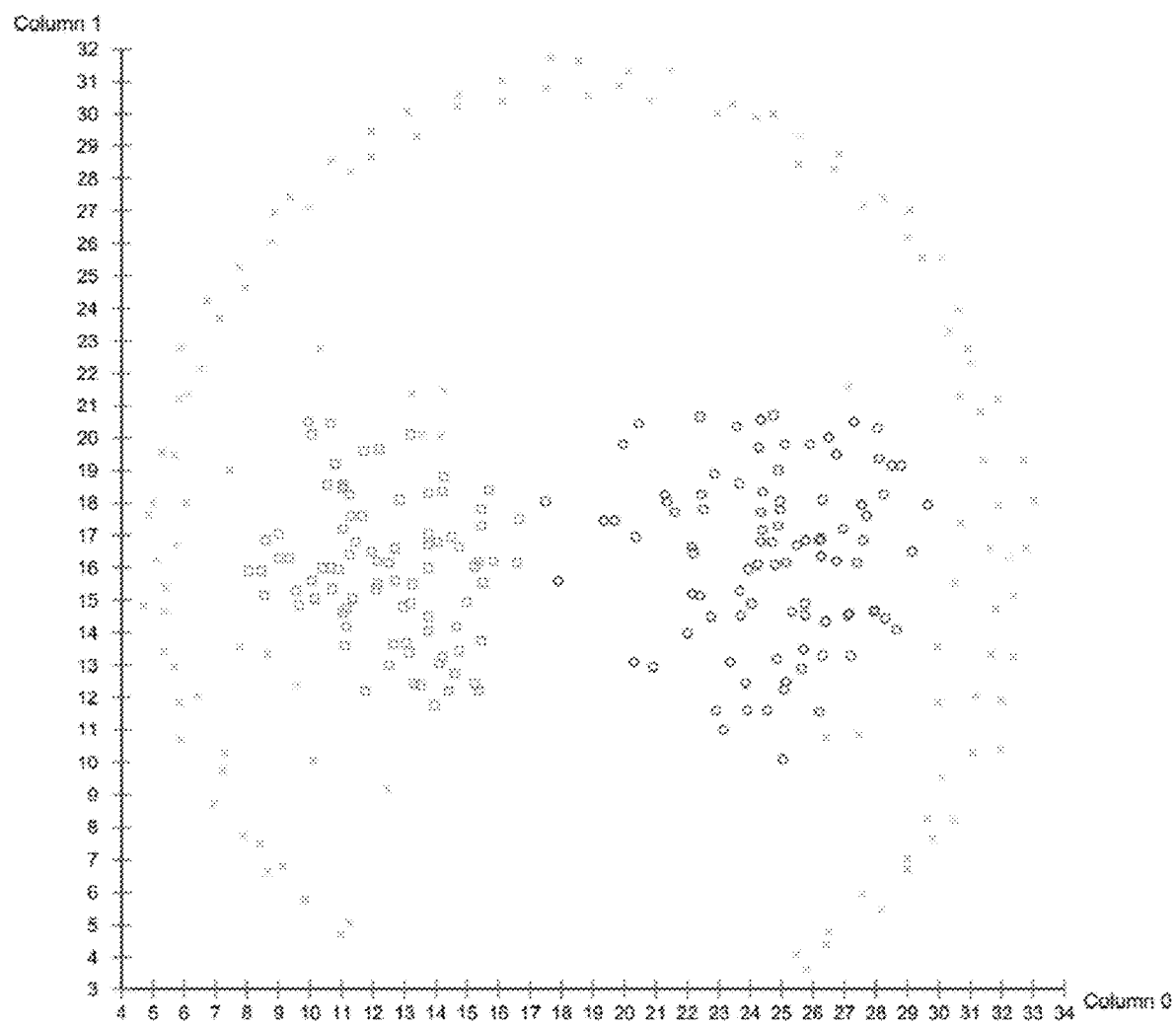
FIG. 3(f) shows the results of data clustering for a data set with a specific shape by using a data clustering method based on the K-nearest neighbor provided by the embodiment of the present invention.
Figure 3G:
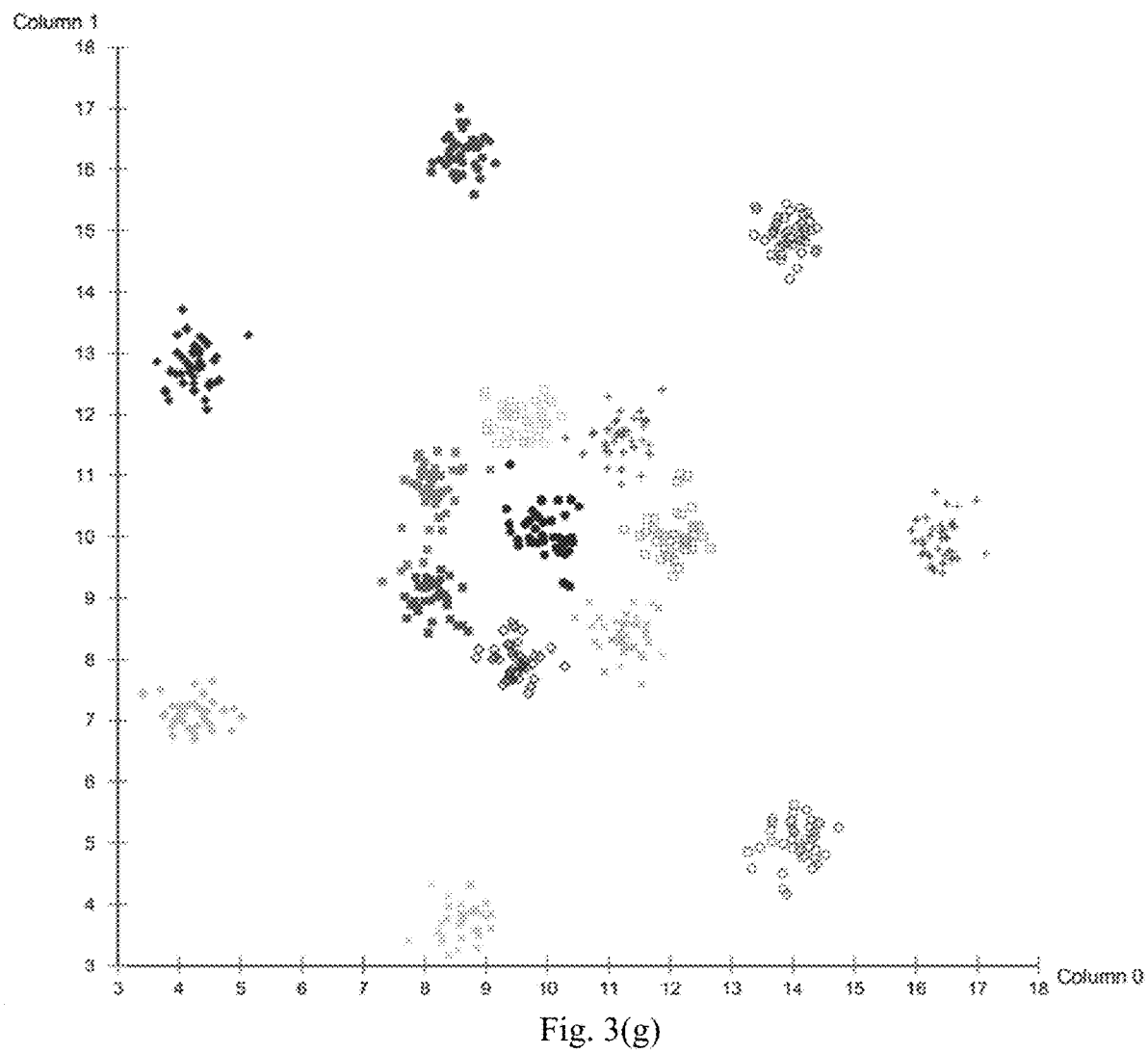
FIG. 3(g) shows the results of data clustering for a data set with a specific shape by using a data clustering method based on the K-nearest neighbor provided by the embodiment of the present invention.
Figure 3H:
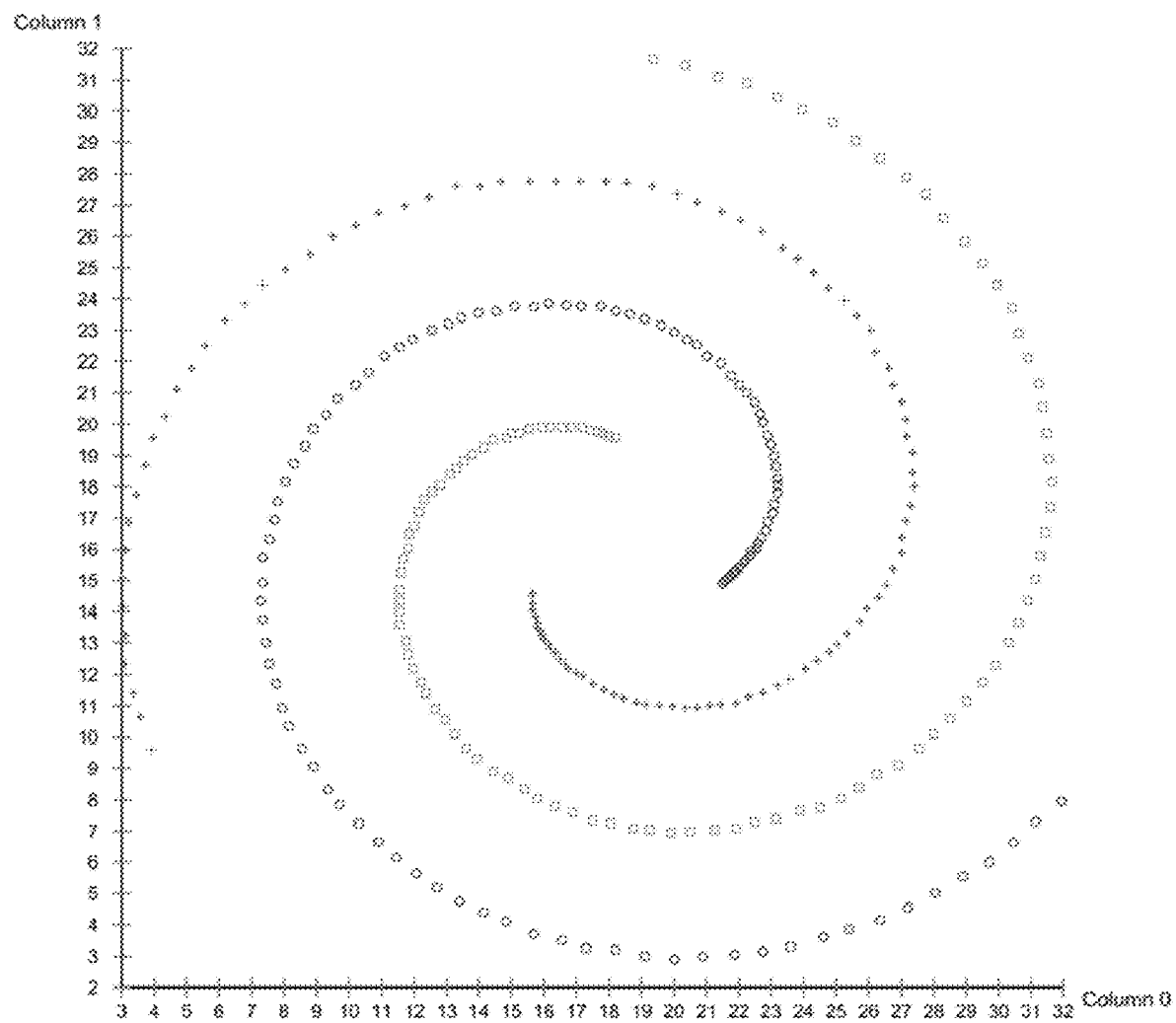
FIG. 3(h) shows the results of data clustering for a data set with a specific shape by using a data clustering method based on the K-nearest neighbor provided by the embodiment of the present invention.

FIG. 3(a) to FIG. 3(h) show the results of data clustering of data sets with different shapes by using the data clustering method based on K-nearest neighbor provided by the embodiment of the present disclosure. As shown in FIG. 3(a), the clustering method provided by this embodiment can overcome the chain effect and correctly identify the two clusters linked by the point chain. FIG. 3(b) to FIG. 3(h) show that clusters with a plurality of different shapes are correctly identified using the clustering method of the present embodiment. As shown in FIG. 3(b), two overlapping clusters with varied densities are correctly identified by using the clustering method of the present embodiment; the two overlapping clusters are a dense cluster and a surrounding sparse cluster respectively. As shown in FIG. 3(d), the noise points are correctly identified. For these given data sets, the number of clusters identified by the clustering method of the present embodiment is exactly equal to the desired cluster number. It can be seen that the data clustering method based on K-nearest neighbor provided by the embodiment is capable to process data sets with arbitrary shapes, varied densities and noise points.

Figure 4:
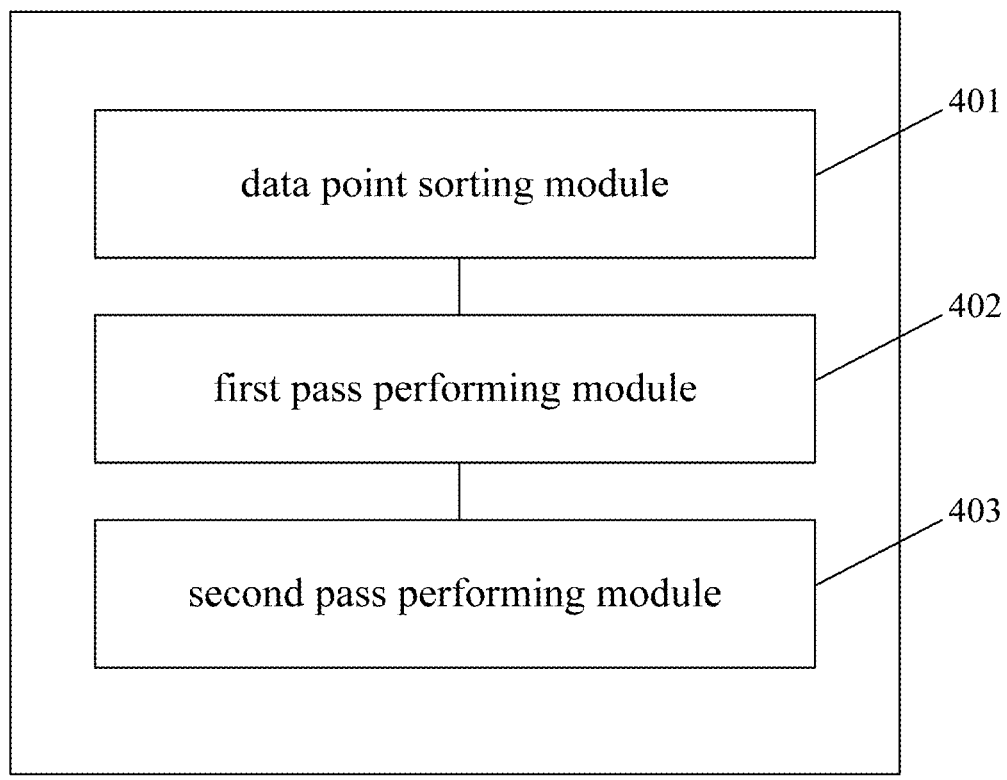
FIG. 4 is a schematic structural diagram of a data clustering apparatus based on e K-nearest neighbor according to an embodiment of the present invention.

With reference to FIG. 4, a data clustering apparatus based on K-nearest neighbor, according to one embodiment of the present disclosure comprises:

a data point sorting module 401, is configured to sort data points to be clustered in ascending order according to the maximum radiuses of K-nearest neighbors of the data points; wherein the maximum radius of the K-nearest neighbor of each said data point refers to a maximum distance from the data point in the K-nearest neighbor of the data point; the K-nearest neighbor of each data point refers to a set of K data points which are nearest the data point. In the present embodiment, the K value is usually 5 to 9;

a first pass performing module 402, is configured to perform a first pass across the data points after sorting the data points in ascending order, calculating a K-nearest neighbor statistical property value of each data point, comparing the K-nearest neighbor statistical property value of the data point and a K-nearest neighbor statistical property value of a proximity cluster of the data point; when the difference between the K-nearest neighbor statistical property value of the data point and the K-nearest neighbor statistical property value of the proximity cluster of the data point is less than a first threshold, incorporating the data point in the proximity cluster; if the data point can be incorporated in multiple proximity clusters, merging proximity clusters from near to far distances between the proximity clusters and the data point to obtain a merged cluster until a number of data points in the merged cluster exceeds a second threshold; when the difference between the K-nearest neighbor statistical property value of the data point and the K-nearest neighbor statistical property value of the proximity cluster of the data point exceeds the first threshold, generating a new cluster that containing the data point; and a second pass performing module 403, is configured to when the first pass is finished, performing a second pass across data points in a cluster of which the number of the data points is less than the second threshold; if the K-nearest neighbor statistical property value of a data point is greater than or equal to n times of the K-nearest neighbor statistical property value of any other data point in the K-nearest neighbor of the data point, marking the data point as noise data point, otherwise incorporating the data point into a cluster to which a data point belongs which is nearest the data point; n>1.

It should be noted that the first threshold is labeled as m, the second threshold is labeled as t.

In the present embodiment, the K-nearest neighbor statistical property value of each data point comprises at least one of a maximum radius of the K-nearest neighbor, a mean radius of the K-nearest neighbor, and a standard deviation of radiuses of the K-nearest neighbor of the data point; correspondingly, the K-nearest neighbor statistical property value of the proximity cluster of the data point comprises at least one of a mean value of the maximum radiuses of the K-nearest neighbors of all data points of the proximity cluster, a mean value of the mean radiuses of the K-nearest neighbors of all data points of the proximity cluster, and a mean value of the standard deviations of the radiuses of the K-nearest neighbors of all data point of the proximity cluster.

Optionally, in the first pass performing module 402, the K-nearest neighbor statistical property value of each data point comprises the mean radius of the K-nearest neighbor and the standard deviation of radiuses of the K-nearest neighbor of the data point. If the K-nearest neighbor statistical property value of the data point and the K-nearest neighbor statistical property value of the proximity cluster of the data point satisfy the following formula 1) and formula 2), the difference between the K-nearest neighbor statistical property value of the data point and the K-nearest neighbor statistical property value of the proximity cluster of the data point is determined to be less than the first threshold:

$$\text{mean}(S(M))\_m \times \text{std}(S(M)) \geq p(M) \leq \text{mean}(S(M)) + m \times \text{std}(S(M)); \quad \text{formula 1)},$$

$$\text{mean}(S(V))\_m \times \text{std}(S(V)) \geq p(V) \leq \text{mean}(S(V)) + m \times \text{std}(S(V)); \quad \text{formula 2)},$$

Wherein, p(M) is the radius mean of the K-nearest neighbor of the data point p, p(V) is the standard deviation of the radiuses of the K-nearest neighbor of the data point p, and mean(S(M)) is the mean value of the mean radiuses of the K-nearest neighbors of all data points of the proximity cluster S, mean(S(V)) is the mean value of the standard deviations of the radiuses of the K-nearest neighbors of all data point of the proximity cluster S, and std(S(M)) is a square deviation of the mean radiuses of the K-nearest neighbors of all data points of, std(S(V)) is a square deviation of the standard deviation of the radiuses of the K-nearest neighbors of all data points of the proximity cluster S, and m is the first threshold, which is a preset coefficient. In this embodiment, m is usually 1~10.

Optionally, in the second pass performing module 403, if the K-nearest neighbor statistical property value of the data point satisfies the following formula 3), it is determined that the K-nearest neighbor statistical property value of a data point is greater than or equal to n times of the K-nearest neighbor statistical property value of any other data point in the K-nearest neighbor of the data point.

$$p(M) \geq q(M) \times n, q \in N\ k(p); \quad \text{formula 3)},$$

wherein, p(M) is the radius mean of the K-nearest neighbor of the data point p, q(M) is the radius mean of the K-nearest neighbor of the data point q, N k (p) is the K-nearest neighbor of the data point p, and the n is usually preset as 3~5.

Optionally, in the second pass performing module 403, cluster in which the total number of data points among all clusters is greater than or equal to the second threshold t is defined as a significant cluster, and a cluster in which the total number of data points among all clusters is less than the second threshold t is defined as a non-significant cluster;

If the K-nearest neighbor statistical property value of a data point is less than or equal to n times of the K-nearest neighbor statistical property value of any other data point in the K-nearest neighbor of the data point, the data point is incorporated into a significant cluster to which a data point belongs which is nearest the data point.

It can be seen that the data clustering apparatus based on K-nearest neighbor provided by the embodiment of the present disclosure sorts data points to be clustered in ascending order according to the maximum radiuses of K-nearest neighbors of the data points, that is, according to the density, and perform the first pass across the data points after sorting the data points in ascending order to incorporate the data points that conform to the statistical similarity into the same cluster; then perform the second pass across the data points with smaller cluster density according to the scale required during the clustering to find out all noise points and incorporate non-noise points into the nearest large-density cluster, so as to realize data clustering. It can be seen that the data clustering method based on K-nearest neighbor provided by the embodiment of the present disclosure has the following technical effects. Firstly, it is not necessary to preset the number of clusters, and it is not necessary to know the probability distribution of the data; secondly, the parameters are easy to set. The value of K is generally 5-9, the value of m is generally 1-10, the value of n is generally 3-5, and the value of significant parameter t can be self-adjusted according to the required cluster size, and the setting of each parameter is independent of the density distribution and distance scale of the data; thirdly, clusters are formed by gradually merging from high density to low density, and the hierarchical relationship between clusters is given when the clusters are generated.

Embodiments of the present disclosure further provide a data clustering apparatus based on K-nearest neighbor, wherein the apparatus comprises a processor, a memory, and a computer program stored in the memory and configured to be executed by the processor, the processor executing the computer program to implement the data clustering method based on K-nearest neighbor mentioned above.

Embodiments of the present disclosure further provide a computer readable storage medium, wherein the computer comprises a stored computer program, wherein when the computer program is running, a device in which the computer readable storage medium is located is controlled to perform the data clustering method based on K-nearest neighbor mentioned above.

Figure 5:
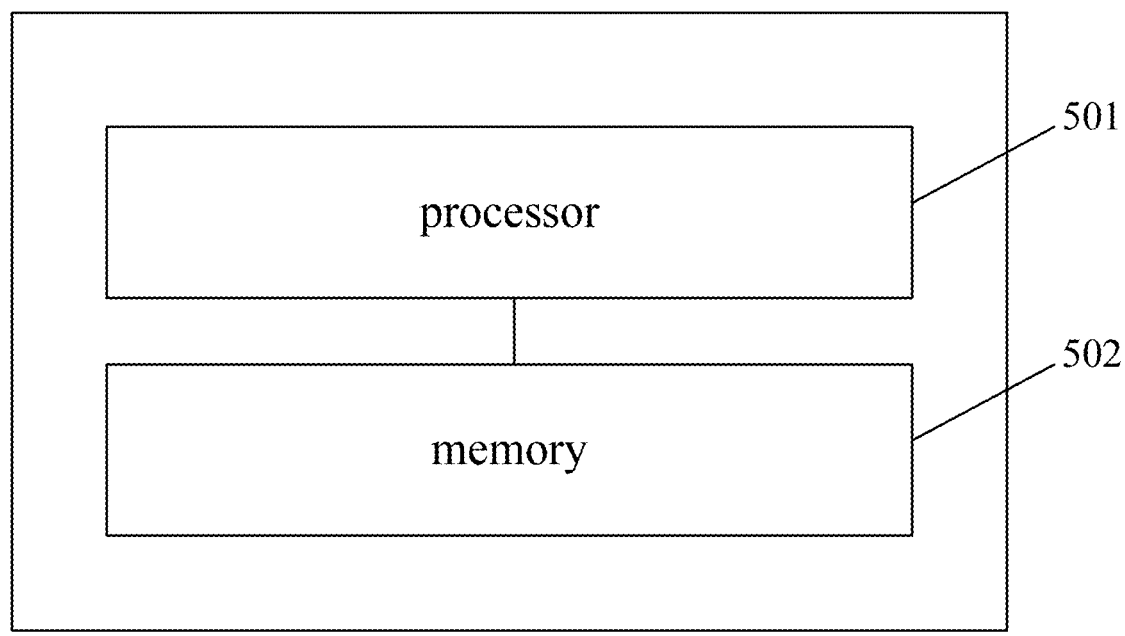
FIG. 5 is a schematic structural diagram of a data clustering apparatus based on K-nearest neighbor according to another embodiment of the present invention.

With reference to FIG. 5, which is a schematic view of a data clustering apparatus based on K-nearest neighbor, the apparatus comprises a processor 501, a memory 502 and a computer program stored in the memory and operable on the processor, such as the above data clustering program based on K-nearest neighbor. When the processor executes the computer program, the steps in the data clustering method based on K-nearest neighbor according the above embodiment are implemented, such as the steps of the data clustering method based on K-nearest neighbor shown in FIG. 1. Alternatively, the processor implements the functions of the modules in the apparatus embodiment described above when the computer program is executed.

In some exemplary embodiments of the present invention, the computer program can be divided into one or more modules/elements, the one or more modules/elements, which are stored in the memory, are executed by the processor to complete the methods in the present disclosure. The one or more modules/elements may be a series of computer program instruction segments which are capable of carrying out a particular function, the instruction segments can be used to describe the execution process of the computer program in the data clustering apparatus based on K-nearest neighbor.

The data clustering apparatus based on K-nearest neighbor may be computing devices such as desktop computers, notebooks, palmtops or cloud servers. The data clustering apparatus based on K-nearest neighbor may include, but is not limited to, a processor, a memory. A person skilled in the art may understand that the schematic diagram is merely an example of the data clustering apparatus based on K-nearest neighbor, does not limit the scope of the data clustering apparatus based on K-nearest neighbor, and the apparatus may include more components or fewer components than those in the figure, some components may be combined, or different component may be used. For example, the data clustering apparatus based on K-nearest neighbor may further include an input/output device, a network access device, a bus and the like.

The processor may be a Central Processing Unit (CPU), or may also be other general-purpose processors, a digital Signal Processor (DSP), a application Specific Integrated Circuit (ASIC), a field-Programmable Gate Array (FPGA), or other programmable logic devices, a discrete gate or a transistor logic device, a discreted hardware component, or the like. The general-purpose processor may be a microprocessor, or may also be any other general processors or the like. The processor, which can connect different parts of the whole apparatus for quickly realize automatic modeling of an architecture based on an architectural drawing together by various interfaces and lines, is the control center of the data clustering apparatus based on K-nearest neighbor.

The memory may be configured to store the computer program and/or module, the processor achieves various functions of the data clustering apparatus based on K-nearest neighbor by running or executing the computer program and/or module stored in the memory, and by calling the data stored in the memory. The memory may mainly include program area and data area, wherein the program area may store an operating system, an application program required for at least one function (such as a sound playback function, an image playback function, etc), and the like. The data area may store the data created according to the use of mobile phone (such as audio data, telephone book, etc). In addition, memory may include high-speed random-access memory, or may also include nonvolatile memory, such as a hard disk, a memory, a pluggable hard disk, a smart media card (SMC), a secure digital card (SD card), a flash card, at least one disk storage device, a flash memory, or other volatile solid-state memory devices.

Wherein, the modules/elements that are integrated by data the clustering apparatus based on K-nearest neighbor can be stored in the readable storage medium of a computer if they are implemented in the form of software function unit and sold or used as an independent product. From this point of view, all or parts of the steps of the method in abovementioned embodiments of present invention may also be performed with the related hardware instructed by the computer programs. The computer programs can be stored in a computer-readable storage medium, and steps of the methods in above mentioned embodiments can be realized when the computer program is executed by the processor. Thereinto, the computer program comprises computer program code; the computer program code may be in source code forms, object code forms, executable files or other intermediate forms, etc. The computer readable medium may include: any entities or devices capable of carrying the computer program code, a recording medium, a USB flash disk, a mobile hard disk, a magnetic disk, a light disk, a computer storage, a read-only memory (ROM), a random access memory (RAM) or a software distribution medium, etc. It should be noted that the information contained in the computer readable medium may be properly increased or decreased according to the requirements of the legislation and the patent practice in a jurisdiction.

It should be noted that the device embodiments described above are merely illustrative, wherein the units described as separate components may or may not be physically separated, and the components displayed as units may or may not be physical, that is, units can be located in one place or distributed as multiple network units. Some or all of the modules may be selected according to actual needs to achieve the purpose of the solution of the embodiment. In addition, in the drawings of the device embodiments provided by the present invention, the connection relationship between the modules indicates that there is a communication connection between them, which is specifically realized by one or more communication buses or signal lines. The ordinary skilled in the art can understand and implement without any creative work.

The above-mentioned embodiments are the preferred embodiments of the present invention. It should be noted that those skilled in the art can make various improvements and modifications without departing from the technical principles of the present invention, such improvements and modifications should also be considered as the protection scope of the present invention.

What is claimed is:

1. A data clustering method based on K-nearest neighbor, wherein the method comprises:
    S1, sorting data points to be clustered in ascending order according to maximum radiuses of K-nearest neighbors of the data points; wherein the maximum radius of the K-nearest neighbor of each said data point refers to a maximum distance from the data point in the K-nearest neighbor of the data point;
    S2, performing a first pass across the data points after sorting the data points in ascending order, calculating a K-nearest neighbor statistical property value of each data point, comparing the K-nearest neighbor statistical property value of the data point and a K-nearest neighbor statistical property value of a proximity cluster of the data point; when the difference between the K-nearest neighbor statistical property value of the data point and the K-nearest neighbor statistical property value of the proximity cluster of the data point is less than a first threshold, incorporating the data point in the proximity cluster; if the data point can be incorporated in multiple proximity clusters, merging proximity clusters from near to far distances between the proximity clusters and the data point to obtain a merged cluster until a number of data points in the merged cluster exceeds a second threshold; when the difference between the K-nearest neighbor statistical property value of the data point and the K-nearest neighbor statistical property value of the proximity cluster of the data point exceeds the first threshold, generating a new cluster that containing the data point; and
    S3, when the first pass is finished, performing a second pass across data points in a cluster of which the number of the data points is less than the second threshold; if the K-nearest neighbor statistical property value of a data point is greater than or equal to n times of the K-nearest neighbor statistical property value of any other data point in the K-nearest neighbor of the data point, marking the data point as noise data point, otherwise incorporating the data point into a cluster to which a data point belongs which is nearest the data point; n>1.

2. The method of claim 1, wherein the K-nearest neighbor of each said data point refers to a set of K data points which are nearest the data point; the K value is preset as 5 to 9.

3. The method of claim 1, wherein the K-nearest neighbor statistical property value of each said data point comprises at least one of a maximum radius of the K-nearest neighbor, a mean radius of the K-nearest neighbor and a standard deviation of radiuses of the K-nearest neighbor of the data point; correspondingly, the K-nearest neighbor statistical property value of the proximity cluster of the data point comprises at least one of a mean value of the maximum radiuses of the K-nearest neighbors of all data points of the proximity cluster, a mean value of the mean radiuses of the K-nearest neighbors of all data points of the proximity cluster and a mean value of the standard deviations of the radiuses of the K-nearest neighbors of all data points of the proximity cluster.

4. The method of claim 3, wherein in the step S2, the K-nearest neighbor statistical property value of each said data point comprises the mean radius of the K-nearest neighbor and the standard deviation of radiuses of the K-nearest neighbor of the data point; if the K-nearest neighbor statistical property value of the data point and the K-nearest neighbor statistical property value of the proximity cluster of the data point satisfy the following formula 1) and formula 2), the difference between the K-nearest neighbor statistical property value of the data point and the K-nearest neighbor statistical property value of the proximity cluster of the data point is determined to be less than the first threshold;

$$\text{mean}(S(M))\_m\times\text{std}(S(M))\geq p(M)\leq \text{mean}(S(M))+m\times\text{std}(S(M));\quad \text{formula 1),}$$

$$\text{mean}(S(V))\_m\times\text{std}(S(V))\geq p(V)\leq \text{mean}(S(V))+m\times\text{std}(S(V));\quad \text{formula 2),}$$

Wherein, p(M) is the radius mean of the K-nearest neighbor of the data point p, p(V) is the standard deviation of the radiuses of the K-nearest neighbor of the data point p, and mean(S(M)) is the mean value of the mean radiuses of the K-nearest neighbors of all data points of the proximity cluster S, mean(S(V)) is the mean value of the standard deviations of the radiuses of the K-nearest neighbors of all data point of the proximity cluster S, and std(S(M)) is a square deviation of the mean radiuses of the K-nearest neighbors of all data points of, std(S(V)) is a square deviation of the standard deviations of the radiuses of the K-nearest neighbors of all data points of the proximity cluster S, and m is the first threshold, which is a preset coefficient.

5. The method of claim 4, wherein the first threshold is set as 1 to 10.

6. The method of claim 2, wherein in the step S3, if the K-nearest neighbor statistical property value of a data point satisfies the following formula 3), it is determined that the K-nearest neighbor statistical property value of the data point is greater than or equal to n times of the K-nearest neighbor statistical property value of any other data point in the K-nearest neighbor of the data point;

$$p(M)\geq q(M)\times n, q\in N\ k(p);\quad \text{formula 3),}$$

Wherein, p(M) is the radius mean of the K-nearest neighbor of the data point p, q(M) is the radius mean of the K-nearest neighbor of the data point q, N k (p) is the K-nearest neighbor of the data point p, and the n is preset as 3~5.

7. The method of claim 6, wherein in the step S3, a cluster in which the total number of data points among all clusters is greater than or equal to the second threshold is defined as a significant cluster, and a cluster in which the total number of data points among all clusters is less than the second threshold is defined as a non-significant cluster;

if the K-nearest neighbor statistical property value of a data point is less than or equal to n times of the K-nearest neighbor statistical property value of any other data point in the K-nearest neighbor of the data point, the data point is incorporated into a significant cluster to which a data point belongs which is nearest the data point.

8. The method of claim 7, wherein the second threshold can be adjusted according to a required cluster size.

9. A data clustering apparatus based on K-nearest neighbor, the apparatus comprising a processor, wherein the processor is configured to execute the following program modules:

a data point sorting module, is configured to sort data points to be clustered in ascending order according to the maximum radiuses of K-nearest neighbors of the data points; wherein the maximum radius of the K-nearest neighbor of each said data point refers to a maximum distance from the data point in the K-nearest neighbor of the data point;

a first pass performing module, is configured to perform a first pass across the data points after sorting the data points in ascending order, calculating a K-nearest neighbor statistical property value of each data point, comparing the K-nearest neighbor statistical property value of the data point and a K-nearest neighbor statistical property value of a proximity cluster of the data point; when the difference between the K-nearest neighbor statistical property value of the data point and the K-nearest neighbor statistical property value of the proximity cluster of the data point is less than a first threshold, incorporating the data point in the proximity cluster; if the data point can be incorporated in multiple proximity clusters, merging proximity clusters from near to far distances between the proximity clusters and the data point to obtain a merged cluster until a number of data points in the merged cluster exceeds a second threshold; when the difference between the K-nearest neighbor statistical property value of the data point and the K-nearest neighbor statistical property value of the proximity cluster of the data point exceeds the first threshold, generating a new cluster that containing the data point; and a second pass performing module, is configured to when the first pass is finished, performing a second pass across data points in a cluster of which the number of the data points is less than the second threshold; if the K-nearest neighbor statistical property value of a data point is greater than or equal to n times of the K-nearest neighbor statistical property value of any other data point in the K-nearest neighbor of the data point, marking the data point as noise data point, otherwise incorporating the data point into a cluster to which a data point belongs which is nearest the data point; n>1.

10. A data clustering apparatus based on K-nearest neighbor, wherein the apparatus comprises a processor, a memory, and a computer program stored in the memory and configured to be executed by the processor, the processor executing the computer program to implement the data clustering method based on K-nearest neighbor according to claim 1.

* * * * *